United States Patent
Esser et al.

(10) Patent No.: US 6,878,041 B2
(45) Date of Patent: Apr. 12, 2005

(54) METHOD FOR REMOVING A METALLIC LAYER OF A LAYER-SYSTEM

(75) Inventors: Winfried Esser, Bochum (DE); Ralph Reiche, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 191 days.

(21) Appl. No.: 10/328,981

(22) Filed: Dec. 23, 2002

(65) Prior Publication Data

US 2003/0148710 A1 Aug. 7, 2003

(30) Foreign Application Priority Data

Dec. 21, 2001 (EP) .............................................. 01130726

(51) Int. Cl.$^7$ ................................................. B24C 1/00
(52) U.S. Cl. .......................................... 451/39; 451/53
(58) Field of Search .............................. 451/38, 39, 40, 451/53, 55, 2, 7; 83/53, 177

(56) References Cited

U.S. PATENT DOCUMENTS

| | | | |
|---|---|---|---|
| 1,978,204 A | * 10/1934 | Hurt | ............................ 241/14 |
| 3,934,379 A | 1/1976 | Braton et al. | |
| 4,527,844 A | 7/1985 | Klee | |
| 4,532,738 A | * 8/1985 | Sippel | ............................ 451/2 |
| 4,627,197 A | * 12/1986 | Klee et al. | ...................... 451/3 |
| 5,044,129 A | * 9/1991 | Olevitch | ....................... 451/53 |
| 5,367,838 A | * 11/1994 | Visaisouk et al. | ............. 451/39 |
| 5,702,288 A | * 12/1997 | Liebke et al. | .................. 451/36 |
| 2001/0004475 A1 | 6/2001 | Allen et al. | |

FOREIGN PATENT DOCUMENTS

| | | |
|---|---|---|
| EP | 0 813 930 A2 | 12/1997 |
| JP | 07 275 795 A | 10/1995 |

* cited by examiner

*Primary Examiner*—Robert A. Rose
(74) *Attorney, Agent, or Firm*—Laurence A. Greenberg; Werner H. Stemer; Ralph E. Locher

(57) ABSTRACT

A metallic layer is cooled below room temperature, leading to an embrittlement. Subsequently, the metallic layer is stripped by performing a blasting process having a high efficiency because of the brittleness. Additionally, the substrate is prevented from being damaged by using a comparatively low blasting energy.

17 Claims, 3 Drawing Sheets

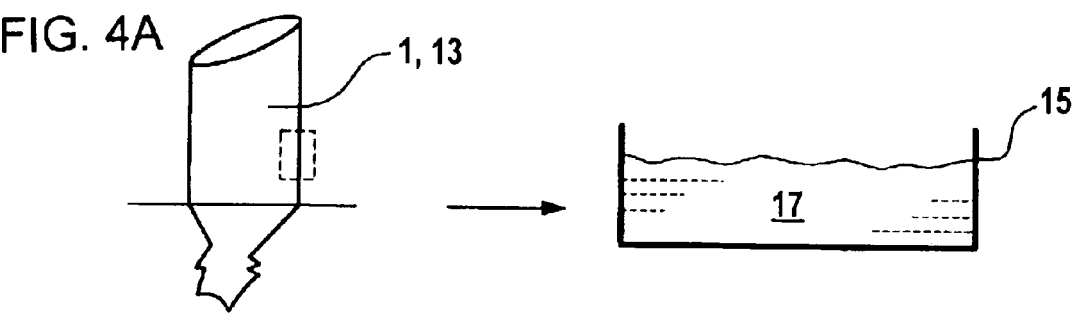
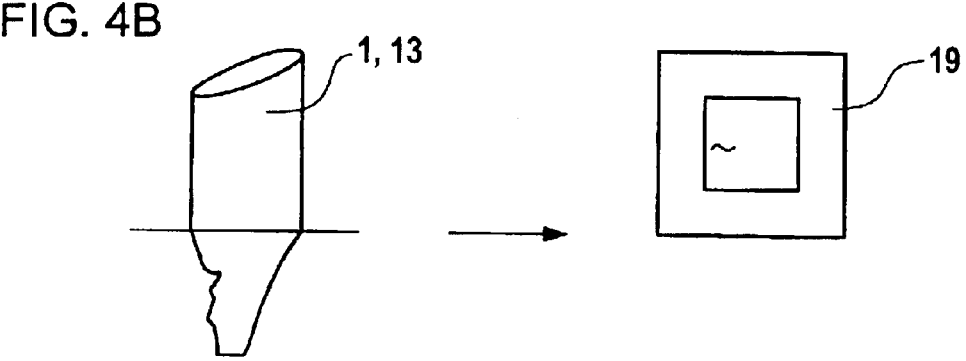
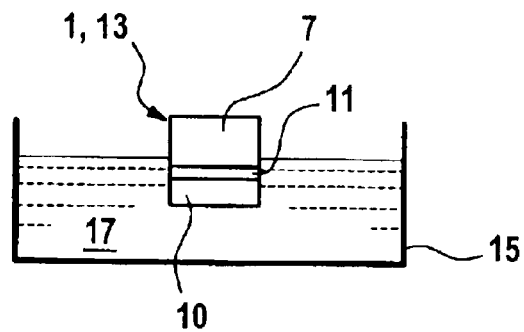
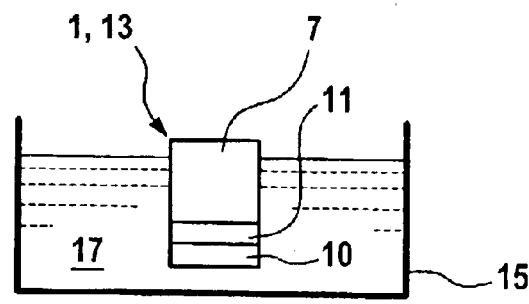

METHOD FOR REMOVING A METALLIC LAYER OF A LAYER-SYSTEM

BACKGROUND OF THE INVENTION

Field of the Invention

This invention relates to a method for removing at least one metallic layer of a layer-system, and in particular relates to using the method to refurbish coated gas turbine blades or vanes.

In modern power generating plants used today, the high efficiency of a gas turbine plays an increasingly vital role. Accordingly, there have been constant efforts in order to improve the efficiency of a gas turbine plant.

One way of achieving this, and the most commonly employed, is to increase the turbine inlet temperatures of the combustion gases. The rotating blades and stationary vanes (both made from high strength nickel or cobalt base superalloys) in the hot section are subject to degradation by a number of attack mechanisms (e.g. oxidation, sulphidation and nitridation).

Considerable efforts have been made into developing protective coatings. These coatings are designed for preventing corrosion attacks of the underlying superalloy. The oxidation and corrosion are localized on and/or within the protective layer and hence restrict damages of the vulnerable base material. Typical coatings of this type are platinum aluminide coatings, chromium diffusion coatings applied by thermochemical processes and MCrAlY coatings applied e.g. by low-pressure plasma spraying. In the equation MCrAlY, M is a metal selected from the group iron, cobalt, nickel, Cr is Chromium, Al is aluminum, and Y stands for Yttrium or another reactive element of the Rare-Earths-elements.

The compositions of these MCrAlY coatings are diverse, but they all have the same objective of protecting the underlying substrate from chemical attack. The design life of a rotating blade or stationary vane in the hot section of a power generating gas turbine is generally 3 or 4 times longer than the service life.

For very high temperature applications, in addition to the protective coating, there is often provided a thermal barrier coating that has the effect of shielding the metallic parts from a hot gas.

As mentioned above, the lifetime of the expensive superalloy base body exceeds that of the protective coating system. Accordingly, refurbishing the protective coating system can save a high amount of costs. This refurbishment operation must be capable of restoring the component within a short period.

As described in the foregoing, various types of chemical attack can occur at the surface of a hot section component. In particular, there is a progressive consumption of the active elements in the coating (i.e. chromium and aluminum). In some cases, although this is not desirable, there may be an attack of the base material. This may be due to the complete consumption of the active material in the coating or due to some physical detachment of the protective coating in service (e.g. foreign object damage). In this case due to their vulnerable nature, substrate attack can be very deep and can involve grain boundary penetration in the case of equiaxed or directionally solidified materials.

A step of a known refurbishment operation includes removing any material of the old coating as well as corroded layers within the base material. Any material of this type that is not completely removed during a refurbishment operation may result in poor adhesion of any subsequently applied new coating. This could have a marked effect on the future performance of such a coating. Also in operation, corrosion products that have not been removed during refurbishment could diffuse deeper into the base material, where they may influence the mechanical properties of the base material.

Mechanical stripping methods are widely used to remove consumed coatings from turbine blades or vanes. These methods include grit blasting with abrasive particles such as alumina or silica and linishing with rotary belts embedded with alumina particles. However, grit blasting may result in damages of the base body surface. Accordingly, effective high rate blasting could lead to considerable base body abrasion.

U.S. Pat. No. 4,627,197 discloses a method for removing organic surface layers. The part with the organic surface layer is cooled, thereby increasing the brittleness of the organic layer and this is followed by a removal step using blasting methods.

Japanese Patent Abstract JP 07275795 A shows a similar method to remove a rubber layer by first cooling and then projecting pellets of dry ice onto the layer.

U.S. Pat. No. 4,527,844 describes a thermally insulated chamber for batch treatment of materials therein at low temperature.

SUMMARY OF THE INVENTION

It is accordingly an object of the invention to provide a method for removing a metallic layer of a layer sytem which overcomes the above-mentioned disadvantages of the prior art methods of this general type, and which leaves the underlying substrate or other layers unaffected.

In particular it is an object of the invention to provide a method of removing a degraded metallic layer effectively, thereby leaving the underlying substrate or other layers unaffected.

With the foregoing and other objects in view there is provided, in accordance with the invention a method for removing a metallic layer of a layer-system including a substrate coated with the metallic layer. The method includes the following steps: cooling at least portions of the layer-system; and stripping at least portions of the metallic layer using a blasting process.

In accordance with an added feature of the invention, the blasting process is an abrasive process.

In accordance with an additional feature of the invention, the blasting process is a non-abrasive process.

In accordance with another feature of the invention, the blasting process is an abrasive sand blasting process.

In accordance with a further feature of the invention, the blasting process is a non-abrasive blasting process projecting dry ice particles.

In accordance with a further added feature of the invention, the cooling step is performed by cooling the layer-system in liquid nitrogen.

In accordance with a further additional feature of the invention, the cooling step is performed by cooling the metallic layer more than the substrate.

In accordance with another added feature of the invention, at a temperature below room temperature, the metallic layer has a higher low-temperature embrittlement than the substrate or an additional layer located between the substrate and the metallic layer.

In accordance with another additional feature of the invention, at a temperature below room temperature, the metallic layer has a higher thermal expansion coefficient than the substrate, thereby leading to a mechanical tension between the metallic layer and the substrate when the cooling step is performed.

In accordance with another further feature of the invention, at a temperature below room temperature, the metallic layer has a higher thermal expansion coefficient than an additional layer located between the substrate and the metallic layer, thereby leading to a mechanical tension between the metallic layer and the additional layer when the cooling step is performed.

In accordance with yet an added feature of the invention, the stripping step includes removing the metallic layer in a controlled manner.

In accordance with yet an additional feature of the invention, after performing the stripping step, residual parts of at least metallic layer are stripped by performing a mechanical process or a chemical process.

In accordance with yet another feature of the invention, the metallic layer includes a brittle material.

In accordance with yet a further feature of the invention, the layer-system is at least a portion of a gas turbine blade or vane.

In accordance with yet a further added feature of the invention, the substrate is made from a superalloy.

In accordance with yet a further additional feature of the invention, the metallic layer includes an alloy of MCrAlY, where M is Fe, Co, or Ni; Cr is chromium; Al is aluminum; and Y is yttrium, any rare-earth element, or a mixture of rare-earth elements.

In accordance with yet an added further feature of the invention, the method includes reheating at least some of the portions of the layer-system that have been cooled.

According to the invention, at a lower temperature than room temperature, the metallic degraded layer has a higher low temperature embrittlement than the underlying substrate or layers. A brittle material is more easily removed by a blasting process. This effect is the so called embrittlement-effect.

By cooling the metallic layer or layers, wherein the material of these layers show a higher embrittlement compared to the substrate, the layer or layers can be removed easily by performing an abrasive blasting process like sand blasting, by blasting ceramic particles, or even by performing non-abrasive blasting processes like water jet blasting or blasting pellets of dry ice.

The layer-system with the metallic layer can be effectively cooled in liquid gases like nitrogen, oxygen, or carbon dioxide, because of the good heat transfer in a liquid to a layer-system of solid state.

The layer-system can be cooled by partly cooling the metallic layer or by cooling the whole layer-system.

Preferably the method causes another effect, by which the metallic layer can be removed even more easy, the so called temperature-tension-effect.

At a low temperature below room temperature, the metallic layer has a higher thermal contraction than the substrate or underlying layers. This is because of a higher thermal expansion coefficient at least partly from room temperature to a low temperature and/or because of a temperature difference between the substrate or the underlying layers and the metallic layer. This different thermal contraction leads to a mechanical tension between the degraded layer and the underlying layers or substrate. By inputting only a small amount of energy, caused by mechanical impact, the tension is increased beyond a spallation threshold, resulting in a spallation of the metallic layer. No abrasive process for removing the layer is needed.

The inventive method can use both the temperature-tension-effect and the embrittlement-effect.

Preferably, this method is used for refurbishing vanes or blades of a gas turbine, which have a superalloy base body. The metallic layer is a so called MCrAlY-layer, which is degraded, especially by corrosion products.

The method can be further improved by utilizing the following steps or properties:

(a) performing the blasting process as an abrasive process;

(b) performing the blasting process as a non abrasive process;

(c) performing the blasting process as a sand blasting process;

(d) using dry ice particles for the non-abrasive blasting process;

(e) cooling the layer-system in liquid nitrogen;

(f) cooling the metallic layer more than the substrate;

(g) using the effect that, at a temperature (LT) below room temperature, the metallic layer has a higher low-temperature embrittlement than the substrate or an additional layer between the substrate and the metallic layer;

(h) using the effect that, at a temperature (LT) below room temperature, the metallic layer has a higher thermal expansion coefficient compared to the substrate or an additional layer between the substrate and the metallic layer, thereby leading to a mechanical tension between the metallic layer and the additional layer or the substrate when the cooling is performed;

(i) removing the at least metallic layer using a controlled process;

(j) stripping residual parts of the at least metallic layer using a mechanical or chemical process;

(k) providing the at least metallic layer with a brittle material;

(l) making the substrate from a superalloy;

(m) constructing the metallic layer from an alloy of the group MCrAlY; and/or (n) at least partly reheating the cooled part of the layer system.

Also all combinations of a) to n) lead to an improvement of the basic inventive method.

BRIEF DESCRIPTION OF THE DRAWINGS

FIGS. 4A to 4F are views showing several steps of the inventive method.

DESCRIPTION OF THE PREFERRED EMBODIMENTS

The invention may be embodied in many different forms and should not be construed as being limited to the illustrated embodiments set forth herein. Rather, these illustrated embodiments are provided so that this disclosure will be thorough and complete, and will fully convey the scope of the invention to those skilled in the art.

Figure 1A:
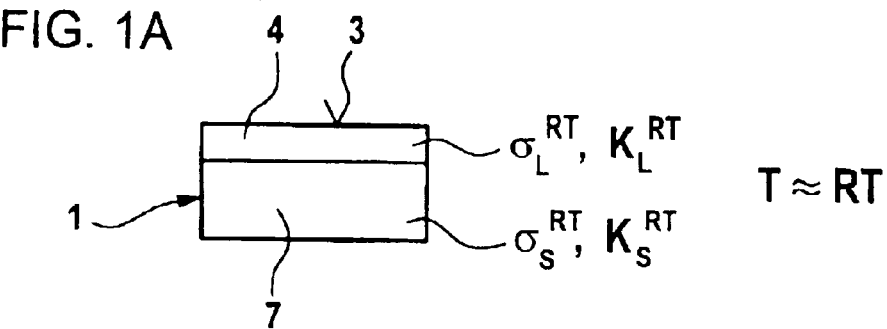
FIG. 1A is a view of a layer-system with a metallic layer at room temperature with known material parameters.
Figure 1B:
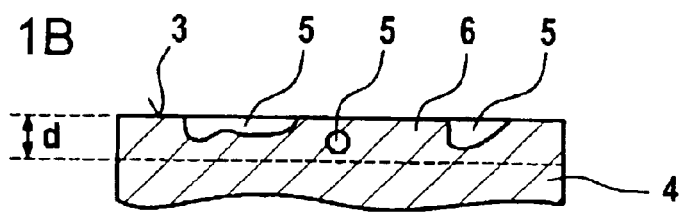
FIG. 1B is a view of a degraded surface in detail.

Referring now to the figures of the drawing in detail and first, particularly, to FIG. 1A thereof, there is shown a layer-system 1, which consists of e.g. a metallic substrate 7 and a metallic surface layer 4, which can be degraded (FIG. 1B).

Figure 3:
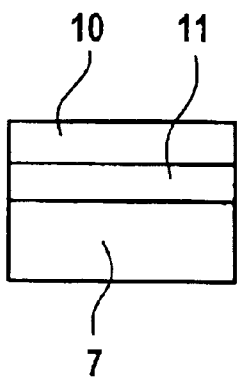
FIG. 3 is a view of a cooled layer-system with two layers.

The layer-system 1 can include layers underlying the surface layer 4 (FIG. 3).

The layer-system 1 is, for instance, designed for a turbine blade, wherein the substrate 7 e.g. is a superalloy base material (e.g. Ni—Cr with Ni3Al) and the metallic surface layer 4 is a so called MCrAlY coating. In the equation MCrAlY: M stands for a metal of Fe, Co, or Ni; Cr is chromium; Al is aluminum; and Y yttrium or any rare-earth element or a mixture of rare-earth elements.

FIG. 1B shows a metallic degraded layer 4 with corrosion products 5 at the surface 3 or at a certain depth from the surface 3.

In order to conserve the expensive base body of the turbine blade, i.e. the substrate 7, the degraded layer 4 needs to be at least partly stripped. The degraded layer 4 consists of ductile and brittle materials. The removal has to be performed in such a manner, that substantially no corrosion products 5 remain. The corrosion products 5 form only a part of the surface layer 4, and their depth into the layer 4 can vary along the surface 3. The corrosion products 5 are often oxides and can be removed by performing a blasting process even at room temperature. However, after such a conventional blasting process there still remain metallic areas 6 at the surface that are ductile and that are difficult to remove using the conventional processes. By now cooling the metallic layer, the low temperature brittleness leads to a surprisingly improved efficiency of the blasting process for metals made brittle by the inventive method.

For uniformly stripping the layer 4, it is necessary to remove a uniform thickness of the metallic layer 4 or to totally remove the metallic layer 4.

As an additional advantage, the invention enables the use of a stripping process in which the blasting particles have comparatively low impact energy. Conventional blasting requires high energies for removing ductile material, leading to a significant danger of damaging the substrate. This danger is substantially reduced by the embrittlement of the cooling step.

For the material of the substrate 7, as well as for the metallic surface layer 4, some material parameters like the strength (σ) and a parameter that indicates the brittleness of the material, for instance, the fracture toughness (K), are shown (FIG. 1A). A high K-value corresponds to a ductile material.

There must be no essential relationship between the material parameters of the substrate 7 and the surface layer 4 at room temperature (RT).

The parameter $$\sigma_s^{RT}$$

indicates the strength of the substrate (s) at room temperature, $$\sigma_s^{LT}$$

indicates the strength of the substrate (s) at a low temperature, $$\sigma_L^{RT}$$

indicates the strength of the layer (L) at room temperature, $$\sigma_L^{LT}$$

indicates the strength of the layer (L) at a low temperature, $$K_s^{RT}$$

indicates the fracture toughness of the substrate (s) at room temperature (RT), $$K_s^{LT}$$

indicates the fracture toughness of the substrate (s) at a low temperature (LT), $$K_L^{RT}$$

indicates the fracture toughness of the layer (L) at room temperature, and $$K_L^{LT}$$

indicates the fracture toughness of the layer (L) at a low temperature.

Figure 2:
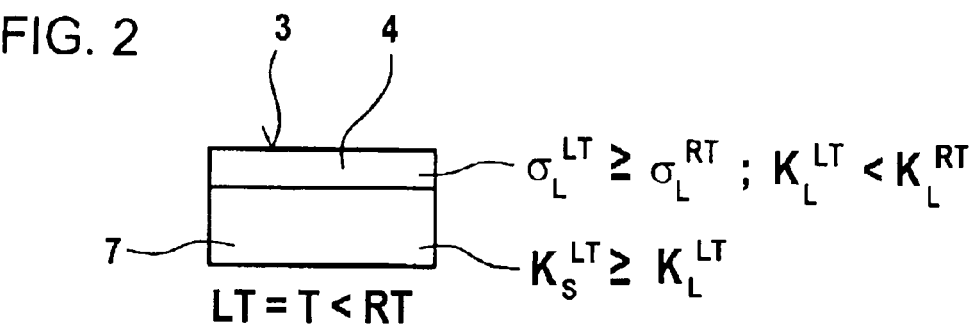
FIG. 2 shows a cooled layer-system with material parameters at low temperature.

FIG. 2 shows the relationship of the material parameters between the substrate 7 and the metallic surface layer 4 at a low temperature (LT), e.g. at about 77K (liquid nitrogen), compared to room temperature (RT).

At the low temperature (LT), the material of the surface layer 4 shows a low temperature embrittlement—that means that the strength of the surface layer 4 is eventually increased, but the K-value is decreased, leading to a more brittle material.

The K-value of the substrate 7 is higher than or equal to the K-value of the surface layer 4.

With a more brittle surface layer 4, the surface layer 4 can be easily removed by a blasting process, e.g. by an abrasive blasting process or a non-abrasive blasting process.

The method might be applied by cooling not the whole layer-system 1, but also by cooling only or by mainly cooling only the metallic surface layer 4, for instance, by dipping the surface layer 4 in liquid nitrogen, wherein the substrate 7 is not in contact with the liquid nitrogen.

If only the metallic surface layer 4 was cooled and the surface layer 4 is removed, the substrate 7 can be further processed immediately. If the whole layer-system 1 was cooled and the surface layer 4 is removed, the substrate 7 is heated up to room temperature before further processing.

Because of the reduced blasting energy, the design and geometry of the substrate remains unaffected. This is of particular importance for blades or vanes since the aerodynamic properties are critical and easily influenced by the geometry and shape.

With that so-called heat tinting is possible to assure the total removal of the metallic surface layer 4 or corrosion products 5. Small areas of the metallic surface layer 4 or corrosion products 5 can still be removed by using other chemical or mechanical processes.

Another effect enabling the removal of the metallic layer 4 of the layer-system 1 is that during cooling, a tension can occur between the metallic surface layer 4 and the substrate 7. This is caused by the different thermal expansion coefficients of the substrate 7 and the surface layer 4.

In this case, no low-temperature embrittlement of the metallic surface layer 4 is needed.

Surprisingly, the method can be applied even for layer-systems that are designed to stand (high-temperature) thermal shocks and mechanical impacts during use, for example, turbine blades of gas turbines made of superalloys coated with a MCrAlY layer and a thermal barrier coating.

The method can even be applied for metallic coatings 4 having materials with different ductility on metallic substrates 7. The metallic surface layer 4 may include metallic material and a ceramic material, like corrosion products 5.

FIG. 3 shows a turbine blade 1, which was first coated with a metallic coating 11, for example, a MCrAlY-layer 11, and was subsequently coated with an outer layer 10 which may be, for example, a ceramic thermal barrier coating 10 or may be a layer formed by corrosion products of the layer 11. The ceramic coating 10 is a brittle material.

During the application of the method for stripping the metallic layer 11, the ceramic material of the outer layer 10 remains on the layer 11 and is stripped first or jointly.

The following steps are performed:

The layer 11 and the outer layer 10 are cooled, leading to embrittlement of the layer 11.

Subsequently, the brittle materials can be easily removed by performing a blasting process by first blasting particles onto the surface of the outer layer 10 and removing the outer layer 10 on the layer 11.

The ceramic outer layer 10 can also be removed by performing a blasting technique in a first step at room temperature without cooling.

The layer-system 1 can also include other layers below the layer 11.

FIG. 4A shows a layer system 1 forming a turbine blade or a turbine vane 13. Additionally, a tank 15 is provided which is filled with a cooling liquid, e.g. liquid nitrogen. The turbine blade or vane 13 will be cooled in this liquid 17.

The turbine blade or vane 13 can also be cooled in a cooling apparatus 19 without having contact with a liquid, as shown in FIG. 4B.

FIG. 4C shows how the turbine blade or vane 13 is cooled in the liquid 17. For simplification, only a part (the area surrounded by the dotted line in FIG. 4A) of the vane or blade 13 is shown in FIG. 4C. FIG. 4C shows a cross-sectional view of the layer system 1, 13 illustrating the substrate 7 and the layers 11, 10.

One possibility of performing the inventive method is to cool the layer 11 by dipping the layer system 1 in the liquid 17 so that the layer 11 is in contact with the cooling liquid 17. The layer 11 is cooled and effects the mechanical properties as described with reference to FIG. 2. The outer layer 10 is also cooled.

It is also possible to cool the whole layer system 1 by dipping the layer system 1 totally in the liquid 17, so the substrate and the layers 10, 11 are in contact with the cooling liquid 17, as shown in FIG. 4D.

Figure 4E:
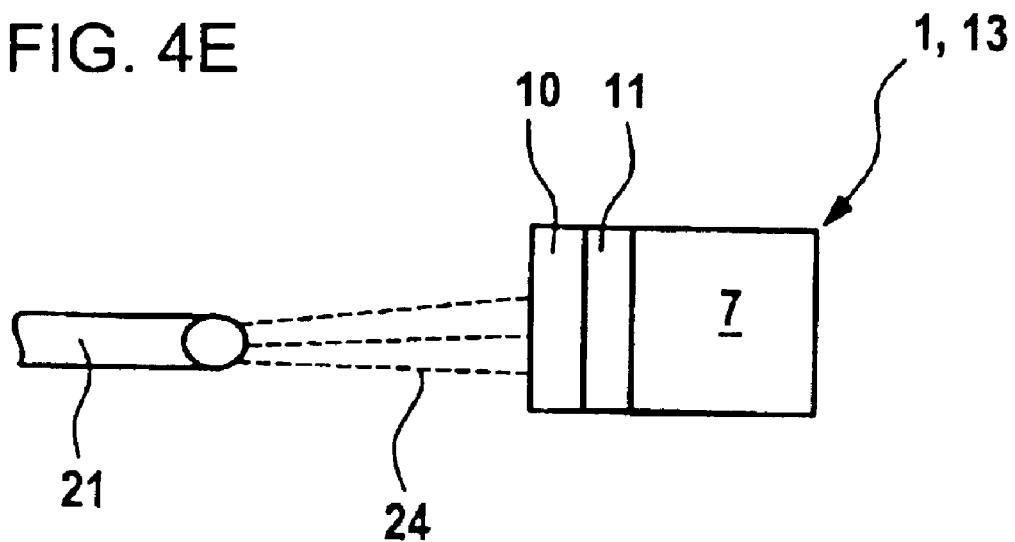

If the desired change in mechanical properties is reached, the layer system 1 is exposed to particles 24 that are blasted onto the surface 3 of the outer layer 10, as shown in FIG. 4E. The particles 24 are supplied by a blasting apparatus 21. The particles 24 can be particles of dry ice or ceramic. The outer layer 10 and the layer 11 are exposed to the blasting particles 24 as long as the layer 11 is almost or totally removed.

Figure 4F:
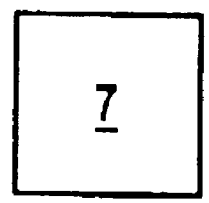

FIG. 4F shows a layer system 1, 13 in which the layers 10, 11 have been completely removed.

We claim:

1. A method for removing a metallic layer of a layer-system including a substrate coated with the metallic layer, the method which comprises:
    cooling at least portions of the layer-system; and
    stripping at least portions of the metallic layer using a blasting process.

2. The method according to claim 1, wherein the blasting process is an abrasive process.

3. The method according to claim 1, wherein the blasting process is a non abrasive process.

4. The method according to claim 1, wherein the blasting process is an abrasive sand blasting process.

5. The method according to claim 1, wherein the blasting process is a non abrasive blasting process projecting dry ice particles.

6. The method according to claim 1, wherein the cooling step is performed by cooling the layer-system in liquid nitrogen.

7. The method according to claim 1, wherein the cooling step is performed by cooling the metallic layer more than the substrate.

8. The method according to claim 1, wherein at a temperature below room temperature, the metallic layer has a higher low-temperature embrittlement than the substrate or an additional layer located between the substrate and the metallic layer.

9. The method according to claim 1, wherein at a temperature below room temperature, the metallic layer has a higher thermal expansion coefficient than the substrate, thereby leading to a mechanical tension between the metallic layer and the substrate when the cooling step is performed.

10. The method according to claim 1, wherein the stripping step includes removing the metallic layer in a controlled manner.

11. The method according to claim 1, which comprises after performing the stripping step, stripping residual parts of at least metallic layer by performing a mechanical process or a chemical process.

12. The method according to claim 1, wherein the metallic layer includes a brittle material.

13. The method according to claim 1, wherein the layer-system is at least a portion of a gas turbine blade or vane.

14. The method according to claim 1, wherein the substrate is made from a superalloy.

15. The method according to claim 1, wherein the metallic layer includes an alloy of MCrAlY, where M is Fe, Co, or Ni; Cr is chromium; Al is aluminum; and Y is yttrium, any rare-earth element, or a mixture of rare-earth elements.

16. The method according to claim 1, which comprises reheating at least some of the portions of the layer-system that have been cooled.

17. The method according to claim 1, wherein at a temperature below room temperature, the metallic layer has a higher thermal expansion coefficient than an additional layer located between the substrate and the metallic layer, thereby leading to a mechanical tension between the metallic layer and the additional layer when the cooling step is performed.

* * * * *